United States Patent
Perkins et al.

(10) Patent No.: US 9,676,443 B2
(45) Date of Patent: Jun. 13, 2017

(54) REMOVABLE POWERPACK AND SEAT FOR A BICYCLE

(71) Applicant: Ford Global Technologies, LLC, Dearborn, MI (US)

(72) Inventors: William Paul Perkins, Dearborn, MI (US); Jason Ashley Cummins, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 14/635,432

(22) Filed: Mar. 2, 2015

(65) Prior Publication Data

US 2016/0257369 A1    Sep. 8, 2016

(51) Int. Cl.
  *B62J 1/00*   (2006.01)
  *B62M 6/90*   (2010.01)
  *B62K 19/30*  (2006.01)

(52) U.S. Cl.
  CPC ............. *B62M 6/90* (2013.01); *B62J 1/00* (2013.01); *B62K 19/30* (2013.01)

(58) Field of Classification Search
  CPC ... B62K 19/36; B62J 1/005; B62J 1/08; B62J 1/00
  USPC .................................................. 297/201, 202
  See application file for complete search history.

(56) References Cited

U.S. PATENT DOCUMENTS

| | | | | |
|---|---|---|---|---|
| 656,854 A * | 8/1900 | Nord | ................ | B62J 1/005 297/201 |
| 5,167,435 A * | 12/1992 | Aldi | ................ | B62J 1/02 297/201 |
| 5,789,898 A * | 8/1998 | Suzuki | ................ | B60L 11/1877 180/68.5 |
| 5,823,618 A * | 10/1998 | Fox | ................ | B62J 1/005 297/195.1 |
| 5,911,474 A * | 6/1999 | Lee | ................ | B62J 1/005 297/201 |
| 6,139,098 A * | 10/2000 | Carrillo | ................ | B62J 1/007 297/195.1 |
| 6,183,043 B1 * | 2/2001 | Nelson | ................ | B62J 1/005 297/201 |
| 6,209,954 B1 * | 4/2001 | Bombardier | ................ | B62J 1/005 297/201 |

(Continued)

FOREIGN PATENT DOCUMENTS

| | | | | |
|---|---|---|---|---|
| CA | WO 2013162362 A1 * | 10/2013 | ............... | A61H 3/04 |
| CN | 202953074 U | 5/2013 | | |

(Continued)

OTHER PUBLICATIONS eFlow E3 Nitro Low Step 2013, Long Island Electric Bikes, 2013. <http://longislandelectricbikes.com/currie-eflow-e3-nitro>.

(Continued)

*Primary Examiner* — Kevin Hurley
*Assistant Examiner* — Gabriela C Craciun
(74) *Attorney, Agent, or Firm* — Frank MacKenzie; Brooks Kushman P.C.

(57) ABSTRACT

A bicycle may include a detachable seat assembly configured to disconnect from a bicycle frame, the detachable seat assembly including a housing, a post extending from the housing and a seat supported by the post, the seat having two flaps extending from and foldable at a joint and configured to fold around the post.

18 Claims, 7 Drawing Sheets

(56) References Cited

U.S. PATENT DOCUMENTS

| | | | | |
|---|---|---|---|---|
| 6,402,236 B1* | 6/2002 | Yates | ........................ | B62J 1/10 |
| | | | | 297/201 |
| 6,663,076 B1* | 12/2003 | Tsai | ........................ | B62K 19/36 |
| | | | | 248/561 |
| 6,786,542 B1* | 9/2004 | Nuzzarello | ............... | B62J 1/005 |
| | | | | 297/195.1 |
| 7,568,714 B2 | 8/2009 | Sasnowski et al. | | |
| 8,602,148 B2 | 12/2013 | Shwartz | | |
| 8,651,212 B2 | 2/2014 | Vincenz | | |
| 9,394,022 B2* | 7/2016 | Alink | ........................ | A61H 3/04 |
| 2005/0173951 A1* | 8/2005 | Jalkanen | ................ | A47C 7/022 |
| | | | | 297/201 |
| 2008/0054689 A1* | 3/2008 | Tucker | .................... | B62J 1/005 |
| | | | | 297/201 |
| 2010/0123339 A1* | 5/2010 | Wen | ........................ | B62J 1/005 |
| | | | | 297/201 |
| 2011/0260510 A1* | 10/2011 | Hsu | ............................ | B62J 1/08 |
| | | | | 297/201 |
| 2011/0260511 A1* | 10/2011 | Sirjord | .................... | B62J 1/005 |
| | | | | 297/201 |
| 2013/0119634 A1* | 5/2013 | Camp | ........................ | B62J 1/08 |
| | | | | 280/287 |
| 2014/0042725 A1* | 2/2014 | Lo | .............................. | B62J 1/08 |
| | | | | 280/281.1 |
| 2014/0375092 A1* | 12/2014 | Curless | .................... | B62J 1/005 |
| | | | | 297/201 |
| 2015/0298760 A1* | 10/2015 | Bigard | .................. | B62K 19/36 |
| | | | | 280/281.1 |
| 2016/0016625 A1 | 1/2016 | Williams | | |

FOREIGN PATENT DOCUMENTS

| | | |
|---|---|---|
| EP | 0798204 B1 | 4/2000 |
| EP | 2287065 A1 | 2/2011 |
| EP | 2377713 A1 | 10/2011 |

OTHER PUBLICATIONS

Search Report from related European Application No. GB1603020.7, dated Aug. 16, 2016, 3 pages.

* cited by examiner

REMOVABLE POWERPACK AND SEAT FOR A BICYCLE

TECHNICAL FIELD

This disclosure relates to a portable battery pack and seat for a bicycle system.

BACKGROUND

A bicycle, also referred to as a bike or cycle, is a vehicle which provides for a human-powered, generally pedal-driven, means to propel the vehicle. Bicycles are generally single-track vehicles, having two wheels attached to a frame, one behind the other. Bicycles generally have a power driven rear wheel and a free spinning turnable front wheel.

Bicycles were introduced in the 19th century in Europe and number more than a billion worldwide. Bicycles are the principal source of transportation in many regions. They also provide a popular form of recreation, and have been adapted for use in military and police applications, in courier services, as children's toys, and in racing. Bicycles are now being adapted to include additional power sources and motors, to ease the physical burden on the user. Electric powered bicycles are often used as an alternative to vehicles such as cars. However, charging the power storage elements of these bicycles is often difficult. Additionally, theft and damage are a concern when parking a bicycle in a public place. It is not always possible to carry one's bicycle into buildings such as offices and schools.

SUMMARY

A bicycle may include a detachable seat assembly configured to disconnect from a bicycle frame, the detachable seat assembly including a housing, a post extending from the housing and a seat supported by the post, the seat having two flaps extending from and foldable at a joint and configured to fold around the post.

A bicycle may include a bicycle frame having a seat stay, a detachable assembly including a housing and a seat post selectively extendable from the housing, the housing configured to removably engage the seat stay, and a seat securable to the seat post and foldable around the seat post.

A method for disengaging a portable seat portion of a bicycle may include folding two flaps of a seat assembly at a joint to encompass a post supporting the seat assembly, locking the folded flaps against a top portion of a housing, the housing configured to house a power supply for the bicycle, and releasing the housing from a frame of the bicycle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Disclosed herein is a bicycle assembly having a portable portion that may be removed from the bicycle and taken with the owner to his or her destination while the bicycle frame remains parked. The portable portion may include the bicycle's power source (e.g., battery) and may be re-charged while removed from the bicycle frame. A seat assembly of the bicycle may also be included with the portable portion. By permitting the portable portion to be removed from the bicycle frame, the more expensive portions of the bicycle (e.g., the seat and power supply) may be kept safe from theft and other elements such as moisture (e.g., rain or dew). Additionally, the power source may be re-charged at the owner's destination while the bicycle is not in use via a charge cord included in the portable portion. Upon returning to the bicycle frame, the portable portion may be easily re-attached to the frame for use.

Figure 1:
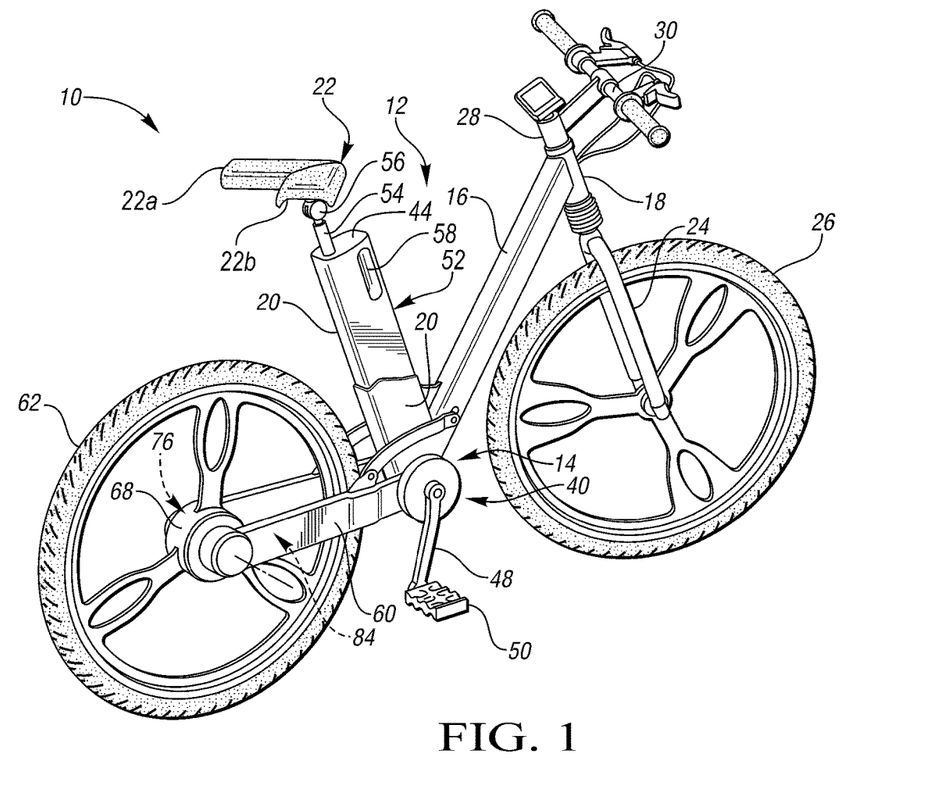
FIG. 1 illustrates a bicycle.

FIG. 1 shows a bicycle 10 having a frame 12. The frame 12 defines a hanger bracket 14, a down-tube 16, and a head-tube 18. Frame 12 has the hanger bracket 14 connected to the down-tube 16. Frame 12 has the head-tube 18 connected to the down-tube 16. Frame 12 may also have a seat stay 20 for supporting a portable portion 36. The seat stay 20 may be connected to the down-tube 16 proximate the hanger bracket 14, connected solely to the hanger bracket 14, or connected to both the hanger bracket 14 and the down-tube 16.

The portable portion 36 (also referred to as a detachable assembly) may include a removable support 52 (also referred to herein as removable housing 52), a seat assembly 22 (also referred to as a seat 22 herein), and a post 54. The post 54 may be retractable into the removable support 52 as described in more detail herein. Specifically, the post 54 may be unlocked via a post-lock (as described with respect to FIG. 6). Moreover, the seat 22 may include two seat portions, or flaps 22a, 22b which may be foldable at a hinged joint 64 (as shown in FIG. 6). Although not shown in FIG. 1, the seat assembly 22 may include a seat-lock 134 (shown in FIGS. 6E and 6F) configured to lock and unlock the two seat portions 22a, 22b (i.e., permit for a folded and unfolded state of the seat). The seat-lock 134 may maintain the seat in an unfolded state and allow the seat 22 to maintain a rider's weight and prevent folding at the joint 64. The seat assembly 22 may include a post-hinge 56 for adjusting the angular offset of the seat 22 (e.g., the vertical position with respect to the post 54). The removable housing 52 may be configured to house certain power elements of the bicycle 10 such as batteries, gears, motor, cords, controller, attachment mechanisms, etc., as described below with respect to FIG. 4. Thus, after use, the owner/user may remove the portable portion 36 and take the seat assembly 22 and the housing 52 containing expensive power components with him or her.

A steerable front fork 24 may be used to support a front wheel 26. The term wheel, as used herein, may include a tire, a rim, and a support structure, such as spokes or the like, to support the tire and rim. A stem 28 may connect the front fork 24 to a set of handlebars 30. The stem 28 may be partially disposed within the head-tube 18 and may have bearings sandwiched between the stem 28 and inner surface of the head-tube 18 to allow the handlebars 30 to turn the front fork 24 and front wheel 26.

Pedals 50 (only one of which is shown) may each be connected to an associated pedal arm 48 and may be configured to drive or propel the bicycle 10. A user may push the pedals 50 to rotate a gear connected to a driveshaft (not shown) to drive the rear wheel 62 forward. Additionally or alternatively, power sources, such as batteries, maintained in the housing 52 may also propel the vehicle in addition to, or without user interaction at the pedals 52.

A rear stay 60 may connect a rear wheel 62 to the frame 12. The rear stay 60 is pivotally connected about the hanger bracket 14. The rear stay 60 may be pivotally connected to the frame 12 about a crank 40 and also may be connected to a wheel hub 68 that supports the rear wheel 62. A gearbox 76 may be disposed in the rear hub 68. The gearbox 76 may be configured to provide a number of speeds for the bicycle 10. The gearbox 76 may be configured to provide at least two speeds for the bicycle 10.

Figure 2:
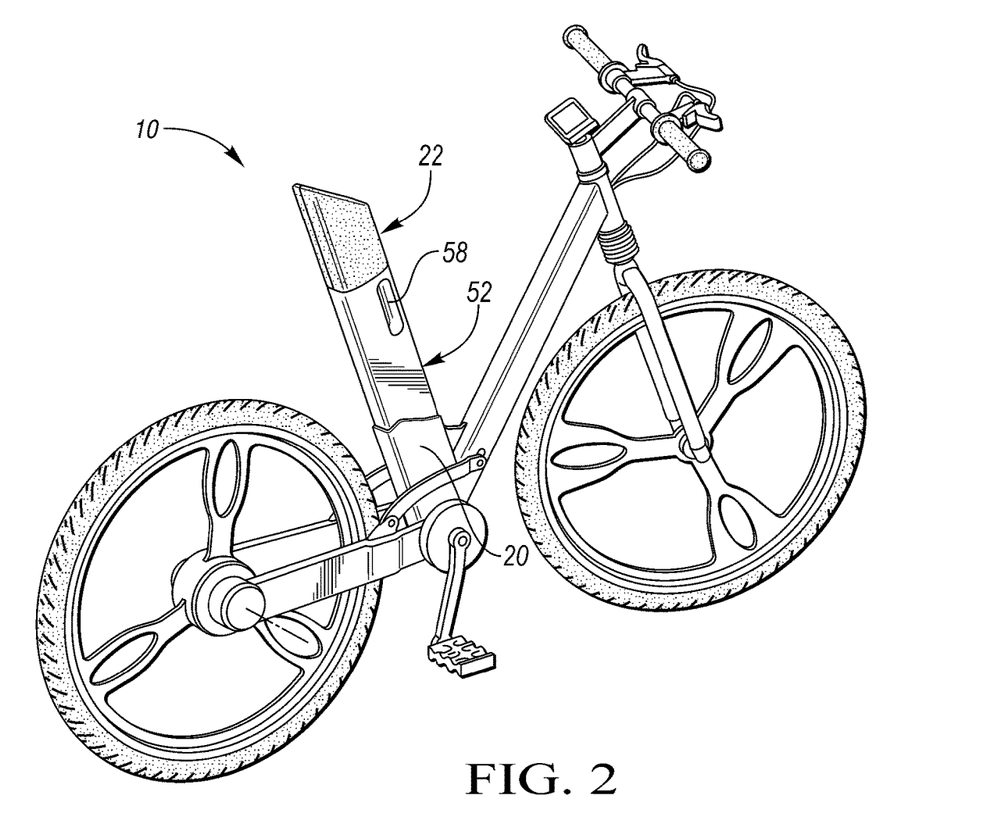
FIG. 2 illustrates a bicycle having a seat in a folded position.

FIG. 2 illustrates bicycle 10 having a seat 22 in a folded position. In this illustration, a portion of the post 54 (as shown in FIG. 1) may be retracted into the removable housing 52. The seat 22 may be folded so as to fit on or in a top portion 44 (as shown in FIG. 2) of the housing 52.

Figure 3:
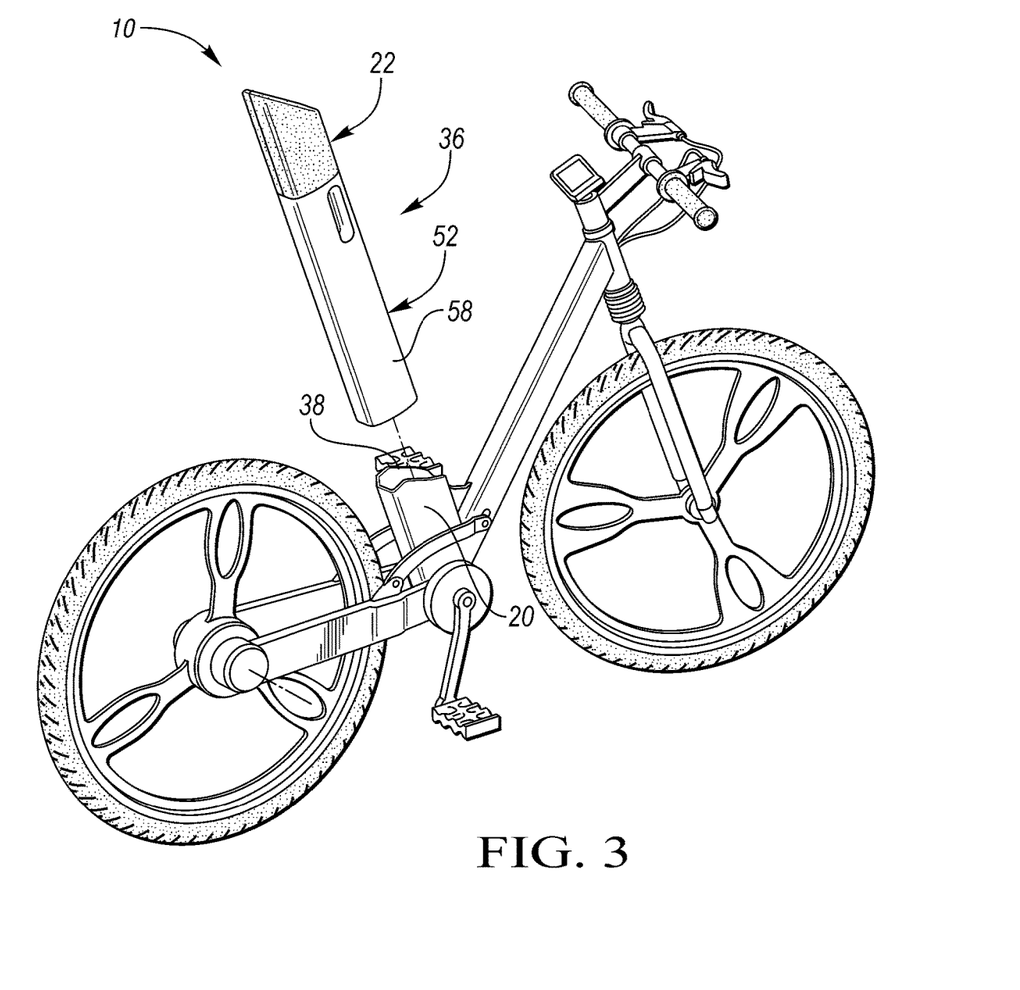
FIG. 3 illustrates a portable portion removed from the bicycle

FIG. 3 illustrates the bicycle 10 having the portable portion 36 removed from the seat stay 20. The seat stay 20 may be configured to release the housing 52. For example, during use the seat stay 20 may receive and lock the housing 52 within it. When a user wishes to park the bicycle and remove the portable portion 36, thus taking the valuable electronics of the bicycle 10 with he or she, the seat stay 20 may release any attachment mechanism 38 maintaining the housing 52 within the stay 20. The attachment mechanism 38 may include a lock (not shown) or other mechanism to maintain the housing 52 within the stay 20 during use.

Figure 4:
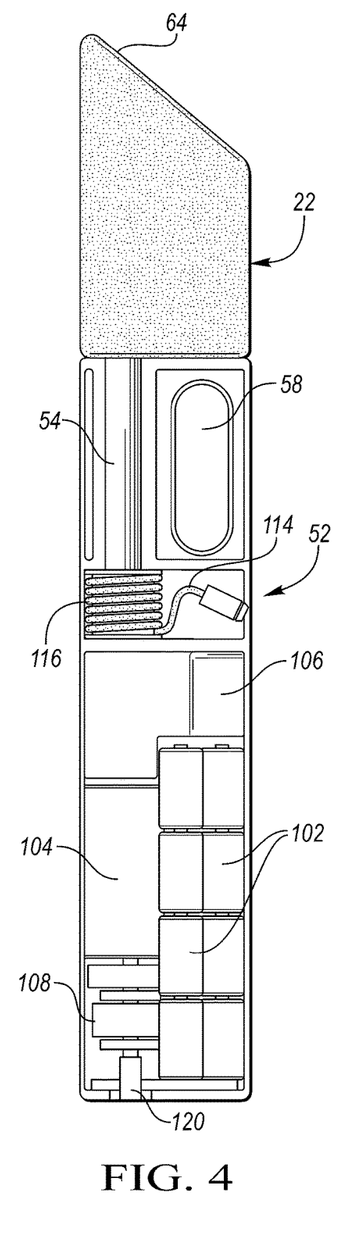
FIG. 4 illustrates a cross-sectional view of the portable portion.

FIG. 4 illustrates a cross-sectional view of the portable portion 36 including the seat assembly 22 and housing 52. The housing 52, as shown, may be configured to house various power components of the bicycle 10. For example, the housing 52 may house one or more batteries 102 configured to provide power to the vehicle 10. The housing 52 may also include a motor 104 or engine for propelling the vehicle 10. A controller 106 having a processor and a memory may also be housed, as well as other gears 108.

Figure 5:
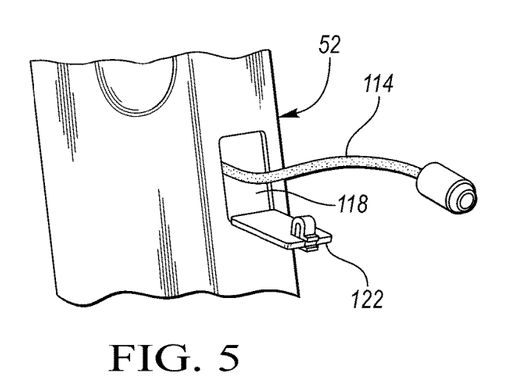
FIG. 5 illustrates a portion of the portable portion.

A charge cord 114 and reel 116 may be included and may be accessible via an access door 122 at a cord opening 118, as shown in FIG. 5. The cord 114 may be configured to provide power to the batteries in an effort to further charge the batteries, which may in turn power the motor 104 during use of the bicycle 10. By incorporating the cord 114 within the housing 52, a user may plug the cord 114 into a power outlet to charge the batteries while the housing 52 is removed from the bicycle 10.

Referring back to FIG. 4, the housing 52 may receive at least a portion of the post 54. For portability, the post 54 may retract into the housing 52 to allow the portable portion 36 of the bicycle 10 to be easier to carry. The seat assembly 22 may also fold and lock onto the housing 52. The housing 52 may define a handle 58 to allow for easy portability of the portable portion 36. While the handle 58 is shown as being defined within the housing 52, other handles may also be used, such as external handles attached to the outer portion of the housing 52, straps, etc. The handle 58 may be arranged to optimize comfort for the user. That is, the handle 58 may be defined at a portion of the housing 52 that centers the weight of the portable portion (e.g., slightly above center, as shown).

The housing 52 may also include a connection point 120 which may be configured to connect with the seat stay 20 when installed therein. The connection point 120 may be an attachment mechanism configured to lock with the seat stay 20 in an effort to further maintain the housing 52 within the stay 20.

Figure 6A:
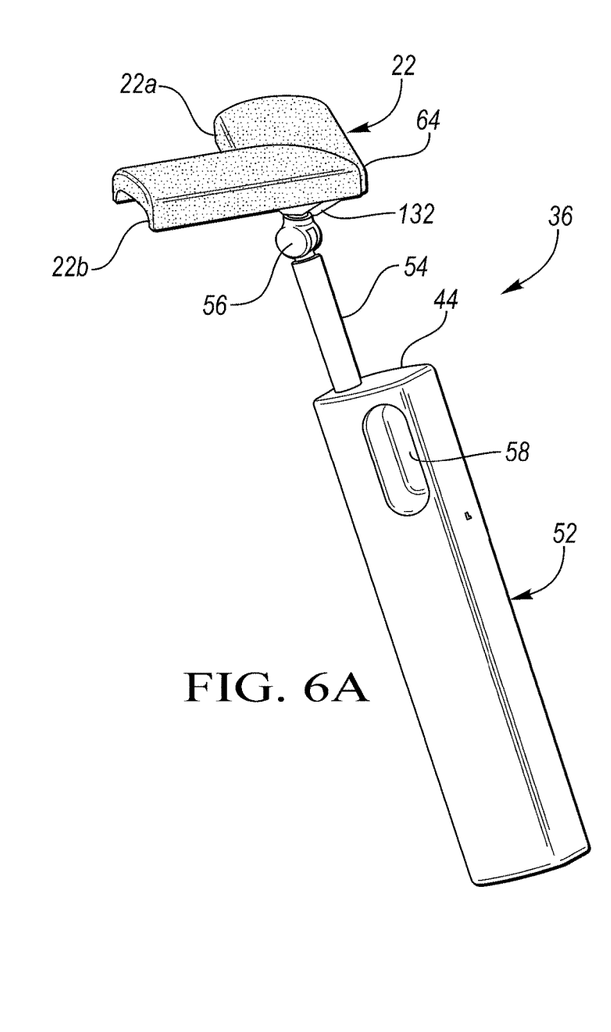
FIGS. 6A-6F illustrate various states of the portable portion.
Figure 6B:
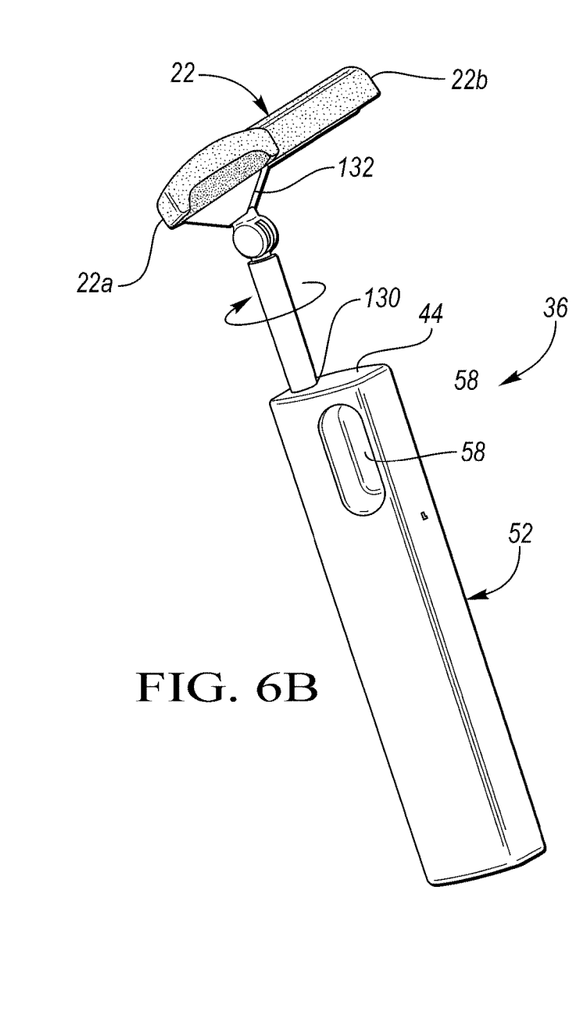

FIGS. 6A-6F illustrate various states of the portable portion 36, specifically with respect to the seat assembly 22 and the post 54. FIG. 6A shows the seat 22 in an unfolded, or assembled, position (i.e., an in-use position). When a user wishes to install the seat 22 on the top portion 44 of the housing 52 for portability, a series of steps and mechanisms may be implemented to achieve a portable state. In FIG. 6B, a post-locking mechanism 130 on the post 54 may be released. The post-locking mechanism 130 may include a 'quick-release' on the post 54 and integrated with the housing 52. In another example, the mechanism 130 may include a nesting tube within the post 54 with spring-loaded detents intended to engage a plurality of holes along the vertical of the post 54. These detents, when not engaged with one of the holes, may permit rotational, as well as vertical movement, of the post 54 with respect to the housing 52. The holes may also maintain the seat and post in a fore-aft direction. The post-locking mechanism 130 may be the same mechanism that maintains the post 54 at a specific height during use. The post-locking mechanism 130 may also be a separate mechanism indented only to unlock the axial position of the post 54. Once the post 54 is unlocked, the post 54, and thus the seat 22, may be rotated 180 degrees.

Figure 6C:
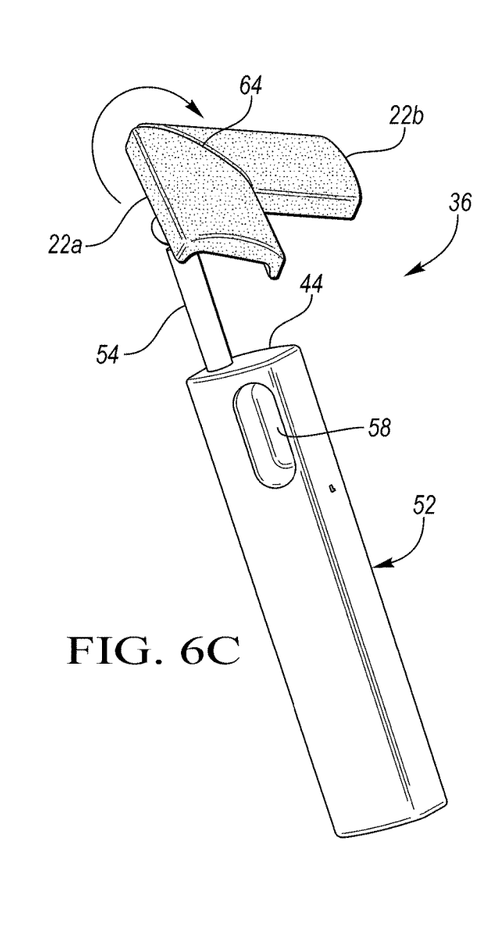
Figure 6D:
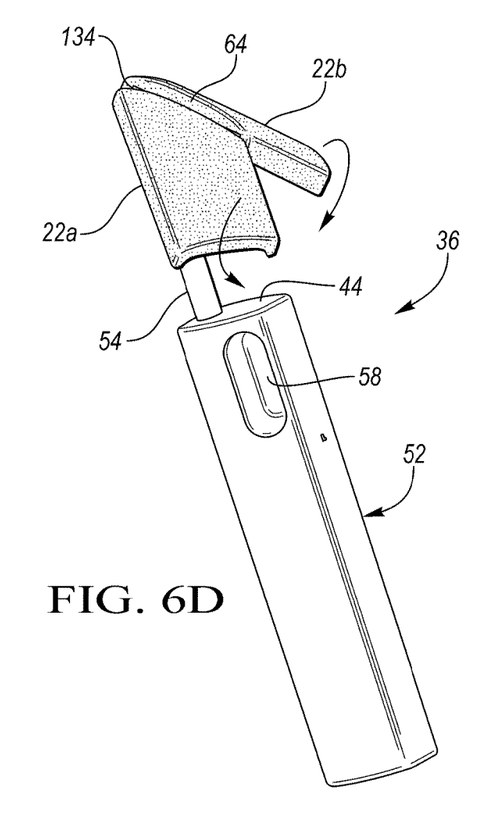
Figure 6E:
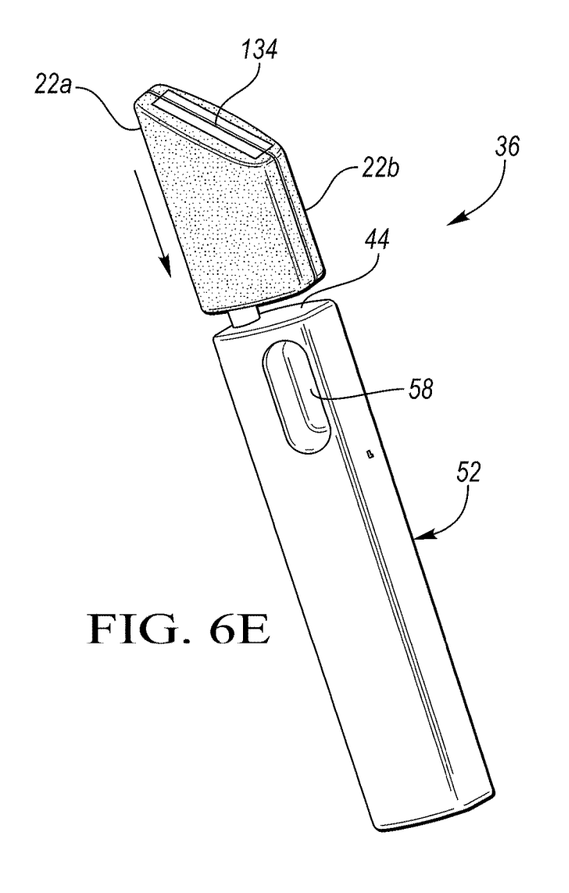

In FIG. 6C, a pitch-lock may be released. The pitch-lock mechanism 132 (shown best in FIGS. 6A and 6B) may hold the seat 22 in a fixed linear position at the post-hinge 56. Once the pitch-lock mechanism 132 is released, the seat 22 may be angled downward towards the top portion 44 of the housing 52. In FIG. 6D, a seat hinge or seat lock 134 (shown best in FIGS. 6E and 6F) may be released allowing each of the two seat portions 22a, 22b to move at the joint 64. In FIG. 6E, the seat portions 22a, 22b may be folded together. The seat portions 22a, 22b may be arranged to include a recess 136 on the underside of the seat portions 22a, 22b so that when in the folded position, the seat portions 22a, 22b encapsulate the post 54, as shown best in FIG. 6E.

Figure 6F:
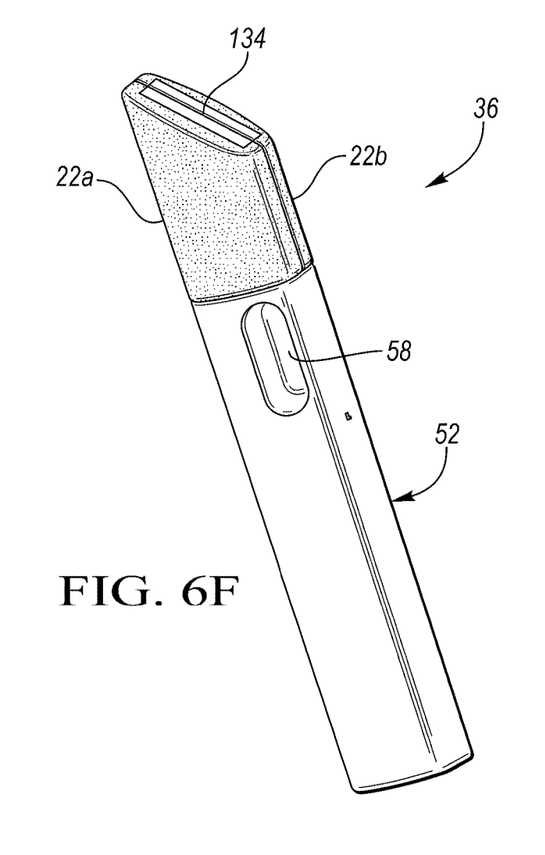

Additionally, the housing 52 may receive at least a portion of the post 54 in response to pressure at the seat 22 (i.e., in response to the user pressing downwards on the seat 22). In FIG. 6F, the folded seat assembly 22 may be received at the top portion 44 of the housing 52. Although not shown, the seat 22 in the folded state may be locked to the housing 52 by a seat-lock. The seat-lock may include a hole and post wherein a simple depression of the post may release the seat from a locked state.

Once the seat is folded onto the top portion 44, the portable portion 36 may be easily removed from the bicycle 10 and taken with the user to his or her destination. The power source (e.g., batteries 102) may then be charged while the bicycle is not in use. The portable portion 36 may then be easily re-installed on the bicycle 10 at the seat stay 20. The seat assembly 22 may easily be brought to an assembled, or un-folded state by extending the seat portions 22a, 22b, locking the seat-hinge 134, adjusting the seat angle and locking the pitch-lock mechanism 132, extending the post 54 out of the housing 52, rotating the post 54 and locking the post-lock mechanism 130.

The steps and processes described herein may be performed in an alternative order. The term bicycle generally refers to a vehicle having two (bi) circular arrangements (cycle), however, as used in this patent application the term bicycle may also be considered to extend to tricycle and quadcycle vehicles having two side-by-side power driven wheels and/or two side-by-side free spinning wheels. The term bicycle may also include vehicles that have additional wheels used to provide stability, such as stabilizer wheels, out-rigger wheels, or training wheels.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bicycle comprising:
a detachable seat assembly configured to disconnect from a bicycle frame including a housing, a post extending from the housing, and a seat supported by the post, the seat having two flaps extending from a joint, an underside of each flap including a recess, the flaps configured to fold at the joint and encapsulate at least a portion of the post within the recesses.

2. The bicycle of claim 1, wherein the housing is configured to receive at least a portion of the post.

3. The bicycle of claim 1, wherein the flaps are configured to abut a top portion of the housing when placed in a folded state.

4. The bicycle of claim 3, further comprising a locking mechanism configured to maintain the seat in the folded state at the top portion of the housing.

5. The bicycle of claim 1, wherein the housing defines at least one handle.

6. The bicycle of claim 1, wherein the post includes a releasable lock configured to permit rotation of the seat when released.

7. The bicycle of claim 1, wherein the seat includes a releasable pitch lock configured to permit adjustments to an angular offset of the seat.

8. The bicycle of claim 1, wherein the joint includes a releasable seat hinge to permit axial movement of the flaps at the joint.

9. A bicycle comprising:
a bicycle frame having a seat stay;
a detachable assembly including a housing and a seat post selectively extendable from the housing, the housing configured to removably engage the seat stay; and
a seat securable to the seat post and foldable around the seat post, wherein the seat includes a releasable pitch-lock configured to permit adjustments to the angular offset of the seat.

10. The bicycle of claim 9, wherein the housing is configured to receive at least one battery, a charging cable, and a controller.

11. The bicycle of claim 9, wherein the seat comprises foldable flaps configured to abut a top portion of the housing in a folded state.

12. The bicycle of claim 9, wherein the housing defines at least one handle.

13. The bicycle of claim 9, wherein the seat post includes a releasable post-hinge configured to permit selective rotation of the seat when in a released position.

14. The bicycle of claim 9, wherein the seat comprises a releasable seat-hinge to permit folding of the seat around the seat post.

15. The bicycle of claim 9, wherein the seat comprises two foldable flaps, an underside of each of the foldable flaps including a recess configured to encapsulate at least a portion of the seat post.

16. A method for disengaging a portable seat portion of a bicycle, comprising:
releasing a post-lock at the post supporting a seat assembly;
rotating the seat assembly about the post;
folding two flaps of the seat assembly at a joint to encompass the post;
locking the folded flaps against a top portion of a housing, the housing configured to house a power supply for the bicycle; and
releasing the housing from a frame of the bicycle.

17. The method of claim 16, wherein the folding of the two flaps of the seat includes:
releasing a pitch-lock at the seat assembly;
adjusting the angular offset of the seat assembly;
releasing a seat-hinge at the joint of the seat assembly; and
folding the flaps about the joint to encapsulate at least a portion of the post.

18. The method of claim 16, further comprising pulling the housing from the frame of the bicycle via a handle defined in the housing.

* * * * *